(12) United States Patent
Southwick et al.

(10) Patent No.: US 9,840,657 B2
(45) Date of Patent: *Dec. 12, 2017

(54) METHOD, SYSTEM, AND COMPOSITION FOR PRODUCING OIL

(71) Applicant: SHELL OIL COMPANY, Houston, TX (US)

(72) Inventors: Jeffrey George Southwick, Rijswijk (NL); Yi Svec, Katy, TX (US); Gordon Thomas Shahin, Bellaire, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 15/445,170

(22) Filed: Feb. 28, 2017

(65) Prior Publication Data

US 2017/0166804 A1 Jun. 15, 2017

Related U.S. Application Data

(62) Division of application No. 14/156,042, filed on Jan. 15, 2014.

(60) Provisional application No. 61/753,261, filed on Jan. 16, 2013.

(51) Int. Cl.
*E21B 43/20* (2006.01)
*C09K 8/588* (2006.01)
*C09K 8/584* (2006.01)
*E21B 43/16* (2006.01)
*E21B 43/26* (2006.01)

(52) U.S. Cl.
CPC .............. *C09K 8/588* (2013.01); *C09K 8/584* (2013.01); *E21B 43/16* (2013.01); *E21B 43/26* (2013.01)

(58) Field of Classification Search
CPC ................................ C09K 8/588; E21B 43/20
USPC .................... 166/305.1, 300, 308.2
See application file for complete search history.

(56) References Cited

U.S. PATENT DOCUMENTS

| | | | |
|---|---|---|---|
| 3,379,249 A | 4/1968 | Gilchrist et al. | |
| 3,927,716 A * | 12/1975 | Burdyn | C09K 8/584 166/270.1 |
| 3,938,590 A | 2/1976 | Redford et al. | |
| 3,943,160 A | 3/1976 | Farmer, III et al. | |
| 3,977,470 A | 8/1976 | Chang | |
| 4,127,122 A | 11/1978 | Kienhofer et al. | |
| 4,156,463 A | 5/1979 | Hall | |
| 4,439,332 A | 3/1984 | Frank et al. | |
| 4,475,592 A | 10/1984 | Pachovsky | |
| 4,502,541 A | 3/1985 | Lawson et al. | |
| 4,572,296 A | 2/1986 | Watkins | |
| 4,609,044 A * | 9/1986 | Lau | E21B 43/24 166/270.1 |
| 4,793,419 A | 12/1988 | Prukop et al. | |
| 4,923,009 A | 5/1990 | Watkins | |
| 5,068,043 A | 11/1991 | Thigpen et al. | |
| 7,559,372 B2 | 7/2009 | Cobb | |
| 8,371,384 B2 | 2/2013 | Rickman et al. | |
| 2005/0085397 A1 | 4/2005 | Hou et al. | |

(Continued)

FOREIGN PATENT DOCUMENTS

| CN | 101861445 | 10/2010 |
|---|---|---|
| CN | 101981271 | 2/2011 |

(Continued)

*Primary Examiner* — Silvana Runyan (57) ABSTRACT

A method, system, and composition for producing oil from a formation utilizing an oil recovery formulation comprising a surfactant, an ammonia liquid, an alkali metal carbonate or bicarbonate, a polymer, and water are provided.

9 Claims, 5 Drawing Sheets

(56) References Cited

U.S. PATENT DOCUMENTS

| | | |
|---|---|---|
| 2005/0199395 A1 | 9/2005 | Berger et al. |
| 2009/0036332 A1 | 2/2009 | Cobb |
| 2009/0159288 A1 | 6/2009 | Szabo et al. |
| 2009/0188661 A1 | 7/2009 | Bizon |
| 2009/0218099 A1 | 9/2009 | Hart et al. |
| 2010/0236783 A1 | 9/2010 | Nenniger et al. |
| 2011/0046024 A1 | 2/2011 | Campbell et al. |
| 2011/0059872 A1 | 3/2011 | Weerasooriya et al. |
| 2011/0059873 A1 | 3/2011 | Weerasooriya et al. |
| 2011/0071057 A1 | 3/2011 | Weerasooriya et al. |
| 2011/0190174 A1 | 8/2011 | Weerasooriya et al. |
| 2011/0272151 A1 | 11/2011 | Matzakos |
| 2012/0186810 A1 | 7/2012 | Dahanayake et al. |
| 2013/0277276 A1 | 10/2013 | Weerasooriya et al. |

FOREIGN PATENT DOCUMENTS

| | | |
|---|---|---|
| WO | 2009108423 | 9/2009 |
| WO | 2011090921 | 7/2011 |
| WO | 2011130310 | 10/2011 |
| WO | 2012158645 | 11/2012 |
| WO | 2000073623 | 12/2012 |

\* cited by examiner

METHOD, SYSTEM, AND COMPOSITION FOR PRODUCING OIL

This application is a divisional application of U.S. patent application Ser. No. 14/156,042, filed on Jan. 15, 2014, which claims priority from U.S. Provisional Application Ser. No. 61/753,261 filed Jan. 16, 2013, which is hereby incorporated by reference in its entirety.

FIELD OF THE INVENTION

The present invention is directed to a method for producing oil from a formation, in particular, the present invention is directed to a method of enhanced oil recovery from a formation.

BACKGROUND OF THE INVENTION

In the recovery of oil from a subterranean formation, it is possible to recover only a portion of the oil in the formation using primary recovery methods utilizing the natural formation pressure to produce the oil. A portion of the oil that cannot be produced from the formation using primary recovery methods may be produced by improved or enhanced oil recovery (EOR) methods.

One enhanced oil recovery method utilizes an alkaline-surfactant-polymer ("ASP") flood in an oil-bearing formation to increase the amount of oil recovered from the formation. An aqueous dispersion of an alkaline component, a surfactant, and a polymer is injected into an oil-bearing formation to increase recovery of oil from the formation, either after primary recovery or after a secondary recovery waterflood. The ASP flood enhances recovery of oil from the formation by lowering interfacial tension between oil and water phases in the formation, thereby mobilizing the oil for production. Interfacial tension between the oil and water phases in the formation is reduced by the surfactant of the ASP flood and by the formation of soaps by alkali interaction with acids in the oil. The polymer increases the viscosity of the ASP fluid, typically to the same order of magnitude as the oil in the formation, so the mobilized oil may be forced through the formation for production by the ASP flood.

Use of ASP enhanced oil recovery to recover oil from subsea oil-bearing formations may be constrained by the amount of space available on an offshore oil recovery platform and by the weight limitations of the platform. Storage facilities must be provided for the polymer, the surfactant, and for the alkaline component. In some instances the offshore platform space and weight limitations preclude the use of ASP enhanced oil recovery since there is not enough room to store all of the components of the ASP flood on the platform or the weight of the components of the ASP flood is prohibitive for use on an offshore oil recovery platform.

Alkalis most commonly used as the alkaline component in ASP EOR processes include alkali hydroxides and alkali carbonates, and the most common alkaline component utilized in an ASP EOR process is sodium carbonate. Offshore oil recovery platform limitations on space and weight may render an alkali carbonate ASP enhanced oil recovery process untenable for recovering oil from a subsea formation due to the relatively large storage space required for the alkali carbonate storage, the large space required for mixing facilities, and the relatively heavy weight of the alkali carbonate solution.

Liquid ammonia may be utilized in place of an alkali carbonate or an alkali hydroxide as the alkaline component of an ASP EOR process to reduce the space requirements of a system for conducting the ASP EOR process. Anhydrous liquid ammonia yields 6.2 times the alkalinity of an equivalent weight amount of sodium carbonate, so the weight requirement of the alkaline component of an ASP flood utilizing anhydrous liquid ammonia may be reduced by 6.2 times relative to sodium carbonate while providing the same relative alkalinity. Less space and weight, therefore, are required to store the ammonia alkaline component relative to alkali carbonates or alkali hydroxides since less of the ammonia alkaline component may be used to provide equivalent levels of alkalinity. On an offshore platform used for recovery of oil from a subsea oil-bearing formation, space and weight savings provided by substituting liquid ammonia for commonly used alkali carbonates may be the determining factor of the feasibility of using an ASP EOR process on the platform and in the formation.

Use of ammonia as the alkaline component in an ASP EOR process and system, however, is limited to utilization with calcium tolerant surfactants. Calcium ions present in the oil and water of the formation and attached to formation surfaces are not precipitated when ammonia is used as the alkaline component of an ASP EOR flood since calcium hydroxide, the calcium precipitate formed when utilizing liquid ammonia as the alkali in an ASP EOR process, will only precipitate at $Ca^{2+}$ concentrations above 8.8% at 25° C.—above the $Ca^{2+}$ concentration in most oil-bearing formations. Therefore, only calcium-tolerant surfactants—those surfactants that are not precipitated in the presence of significant quantities of calcium cations—may be utilized in ASR EOR process having ammonia as the alkaline component without substantial loss of surfactant to calcium precipitation. The most commercially practical calcium-tolerant surfactants useful in an ASP EOR process, however, are the ethylene oxide sulfate, propylene oxide sulfate, and ethylene oxide-propylene oxide sulfate surfactants that hydrolyze at an unacceptable rate above 60° C. Therefore, ASP EOR processes utilizing ammonia as the alkaline component are not particularly commercially practical in formations having significant concentrations of calcium ions therein and a formation temperature of at least 60° C., and ASP EOR processes in offshore formations having these characteristics may be commercially impractical.

Improvements to existing ASP enhanced oil recovery methods, compositions, and systems are desirable. In particular, methods, compositions, and systems effective to further enable utilization of ASP-based enhanced oil recovery in subsea oil-bearing formations having significant concentrations of calcium ions and formation temperatures of at least 50° C. or at least 60° C. are desirable.

SUMMARY OF THE INVENTION

In one aspect, the invention is directed to a process for recovering oil from an oil-bearing formation, comprising:

mixing a surfactant, water, a polymer, an alkali metal carbonate, and ammonia liquid comprising at most 10 wt. % water to form an oil recovery formulation;

introducing the oil recovery formulation into the oil-bearing formation;

contacting the oil recovery formulation with oil in the oil-bearing formation; and producing oil from the oil-bearing formation after introduction of the oil recovery formulation into the oil-bearing formation.

In another aspect, the invention is directed to a composition comprising a surfactant, a polymer, an alkali metal carbonate, ammonia, and water.

In another aspect, the invention is directed to a system, comprising:
  a surfactant;
  a polymer;
  an ammonia liquid comprising at most 10 wt. % water;
  an alkali metal carbonate;
  water;
  an oil-bearing formation;
  a mechanism for introducing the surfactant, the polymer, the alkali metal carbonate; the ammonia liquid, and the water into the oil-bearing formation; and
  a mechanism for producing oil from the oil-bearing formation subsequent to introduction of the surfactant, the polymer, the alkali metal carbonate; the ammonia liquid, and the water into the oil-bearing formation.

In another aspect, the present invention is directed to a process for recovering oil from an oil-bearing formation, comprising:
  introducing a surfactant, water, a polymer, an alkali metal carbonate, and an ammonia liquid containing at most 10 wt. % water into the oil-bearing formation;
  mixing the surfactant, water, polymer, the alkali metal carbonate, and ammonia liquid in the oil-bearing formation to form an oil recovery formulation;
  contacting the oil recovery formulation with oil in the oil-bearing formation; and
  producing oil from the oil bearing-formation after introduction of the surfactant, water, polymer, alkali metal carbonate, and ammonia liquid into the oil-bearing formation.

DETAILED DESCRIPTION OF THE INVENTION

The present invention is directed to a method and system for enhanced oil recovery from an oil-bearing formation utilizing a surfactant, water, a polymer, an alkali metal carbonate or bicarbonate, an ammonia liquid comprising at most 10 wt. % water, and a composition comprising a surfactant, a polymer, an alkali metal carbonate or bicarbonate, ammonia, and water. The surfactant, water, polymer, alkali metal carbonate or bicarbonate, and ammonia liquid may be mixed together to form an oil recovery formulation for use in the enhanced oil recovery process. The surfactant, alkali metal carbonate or bicarbonate, and the ammonia may mobilize the oil in the formation by reducing interfacial tension between oil and water in the formation, the polymer may provide a viscosity sufficient to drive the mobilized oil through the formation for production from the formation, and the alkali metal carbonate or bicarbonate may promote the precipitation of calcium and magnesium in the formation thereby inhibiting calcium and magnesium induced precipitation of the surfactant.

Use of ammonia is favorable for reducing space and weight requirements of an ASP EOR process relative to conventionally used alkali metal carbonates. For example, anhydrous liquid ammonia yields 6.2 times the alkalinity of an equivalent weight amount of sodium carbonate, so the weight requirement of the alkali component of an ASP flood system utilizing anhydrous liquid ammonia may be reduced by 6.2 times relative to sodium carbonate while providing the same relative alkalinity. Less space and weight, therefore, are required to store the ammonia alkali component of the ASP flood system of the present invention relative to conventionally used alkali-carbonate alkali components since less must be used to provide equivalent levels of alkalinity. On an offshore platform used for recovery of oil from a subsea oil-bearing formation, space and weight savings provided by substituting liquid ammonia for conventionally used alkali components may be the determining factor of the feasibility of using an ASP EOR process on the platform. Sufficient alkali metal carbonate or bicarbonate may be included in the ASP mixture to precipitate calcium encountered in the formation as the ASP slug moves through the formation, permitting the use of commercially practical surfactants in the ASP mixture that are stable at formation temperatures above 60° C. but are susceptible to precipitation in the presence of calcium. Preferably, significantly less alkali metal carbonate or bicarbonate is provided in the ASP mixture utilized in the process and system of the present invention than in a conventional ASP flood that utilizes an alkali metal carbonate or bicarbonate as the only or primary alkaline component, thereby realizing the space and weight savings provided by using ammonia as an alkaline component of the ASP mixture while enabling the use of calcium and magnesium intolerant surfactants in the ASP mixture.

The oil recovery formulation composition of the present invention that may be used in the method or system of the present invention is comprised of a surfactant, a polymer, an alkali metal carbonate or bicarbonate, ammonia, and water. The water may be fresh water or a brine solution. The water may have a total dissolved solids (TDS) content of from 100 ppm to 200000 ppm. The water may be provided from a water source, where the water source may be a fresh water source having a TDS content of less than 10000 ppm selected from the group consisting of a river, a lake, a fresh water sea, an aquifier, and formation water having a TDS content of less than 10000 ppm, or the water source may be a saline water source having a TDS content of 10000 ppm or greater selected from the group consisting of seawater, estuarine water, brackish water, an aquifer, a brine solution provided by processing a saline water source, and formation water having a TDS content of 10000 ppm or greater.

When the ASP EOR process utilizing the oil recovery formulation is conducted offshore to recover oil from a subsea oil-bearing formation, the water may be seawater treated to reduce the salinity of the seawater to a desired TDS content. The salinity of the seawater may be reduced by conventional desalination processes, for example, by passing the seawater through one or more nanofiltration, reverse osmosis, and/or forward osmosis membranes or an ion exchange material.

The TDS content of the oil recovery formulation water may be adjusted to optimize the salinity of the water for the production of a middle phase, type III, microemulsion of the oil recovery formulation in combination with oil and formation water in the formation and thereby minimize interfacial tension between oil and water in the formation to maximize mobilization, and therefore, production, of the oil from the formation. The TDS content of the oil recovery formulation water may also be adjusted to optimize the viscosity of the oil recovery formulation, since the viscosity of the oil recovery formulation is dependent in part on the viscosity of the polymer in the formulation, which may be dependent on the salinity of the formulation. Determination of the optimum salinity of the oil recovery formulation water for minimizing interfacial tension of the oil and water in the oil-bearing formation and for providing a viscosity on the same order of magnitude as the oil in the formation may be conducted according to methods conventional and known to those skilled in the art. One such method is described in WO Pub. No. 2011/090921. Salinity optimization of the water may be conducted in accordance with methods conventional and known to those skilled in the art, for example, salt concentrations may be decreased by ionic filtration using one or more nanofiltration membrane units, one or more reverse osmosis membrane units, and/or one or more forward osmosis membrane units; salt concentrations may be increased by adding one or more salts, preferably NaCl, to the water; salt concentrations may be decreased by ion exchange with an ionic exchange material that releases hydrogen and hydroxide ions in exchange for ions in the water, and salt concentrations may be increased or decreased by blending of the resulting permeates and retentates of ionic filtration to provide optimum salinity.

The oil recovery formulation may also be comprised of a co-solvent miscible with water, where the co-solvent may be a low molecular weight alcohol including, but not limited to, methanol, ethanol, and propanol, isobutyl alcohol, secondary butyl alcohol, n-butyl alcohol, t-butyl alcohol, or a glycol including, but not limited to, ethylene glycol, 1,3-propanediol, 1,2-propandiol, diethylene glycol butyl ether, triethylene glycol butyl ether, or a sulfosuccinate including, but not limited to, sodium dihexyl sulfosuccinate. The co-solvent may be utilized for the purpose of adjusting the salinity of the oil recovery formulation fluid to optimize the salinity of the fluid for maximum reduction of interfacial tension between oil and water in the formation, and, optionally, for assisting in prevention of formation of a viscous emulsion upon conducting the EOR process. If present, the co-solvent may comprise from 100 ppm to 50000 ppm, or from 500 ppm to 5000 ppm of the oil recovery formulation. A co-solvent may be absent from the oil recovery formulation, and the oil recovery formulation may be free of a co-solvent.

The oil recovery formulation further comprises ammonia, where the ammonia may interact with oil in the formation to form a soap effective to reduce the interfacial tension between oil and water in the formation. The ammonia may also reduce surfactant adsorption on the reservoir rock surfaces. An ammonia liquid may be mixed with other components of the enhanced oil recovery formulation to form the enhanced oil recovery formulation, where the ammonia liquid may be mixed with the other enhanced oil recovery formulation components 1) prior to introduction of the enhanced oil recovery formulation to the oil-bearing formation, or 2) after one or more of the enhanced oil recovery formulation components have been individually introduced into the formation, or 3) simultaneously with introduction of one or more of the enhanced oil recovery formulation components into the formation, but separate from at least one of the components. The ammonia liquid mixed with the other components of the oil recovery formulation to form the oil recovery formulation utilized in the ASP EOR process and system of the present invention, and to form the composition of the present invention, may be an ammonia liquid comprising at most 10 wt. % water, or at most 5 wt. % water, or at most 1 wt. % water and at least 90 wt. % ammonia. Most preferably, the ammonia liquid is anhydrous liquid ammonia to minimize the weight and space requirements for storing and utilizing the liquid ammonia in the ASP EOR process and system of the present invention.

The oil recovery formulation further comprises an alkali metal carbonate or an alkali metal bicarbonate, where the alkali metal carbonate or bicarbonate may be effective to form precipitates with calcium cations encountered by the oil recovery formulation in the oil-bearing formation. The alkali metal carbonate or bicarbonate may also interact with oil in the formation to form a soap effective to reduce the interfacial tension between oil and water in the formation. The alkali metal carbonate or bicarbonate is preferably selected from the group consisting of sodium carbonate, sodium bicarbonate, potassium carbonate, potassium bicarbonate, and mixtures thereof, and most preferably is sodium carbonate. The alkali metal carbonate or bicarbonate, or an aqueous solution of an alkali metal carbonate or bicarbonate, may be mixed with other components of the enhanced oil recovery formulation to form the enhanced oil recovery formulation, where the alkali metal carbonate or bicarbonate or aqueous solution of alkali metal carbonate or bicarbonate may be mixed with the other enhanced oil recovery formulation components 1) prior to introduction of the enhanced oil recovery formulation to the oil-bearing formation, or 2) after one or more of the enhanced oil recovery formulation components have been individually introduced into the formation, or 3) simultaneously with introduction of one or more of the enhanced oil recovery formulation components into the formation, but separate from at least one of the components.

The ammonia liquid and the alkali metal carbonate or bicarbonate are mixed with the other components of the oil recovery formulation, or are present in the oil recovery formulation, in an amount to provide the oil recovery formulation with a pH of at least 10. The ammonia liquid mixed with the other components of the oil recovery formulation, or the ammonia present in the oil recovery formulation, may provide relatively highly buffered alkalinity to the oil recovery formulation due to ammonia's dissociation constant, enabling the oil recovery formulation to have a relatively low but useful pH for an alkaline solution used in an ASP EOR process. The alkali metal carbonate or bicarbonate may also provide relatively highly buffered alkalinity to the oil recovery formulation. A relatively low alkaline pH ASP oil recovery formulation (e.g. pH 9 to pH 12) may be desirable for use in certain oil-bearing formations to prevent dissolution of formation minerals by strong alkalinity (e.g. pH >12)—for example, sandstone formations containing significant quantities of silica quartz. Furthermore, the relatively highly buffered alkalinity provided to the oil recovery formulation by the ammonia and the alkali metal carbonate or bicarbonate may decrease the time required and the amount of oil recovery formulation required for the oil recovery formulation to breakthrough from an injection well to a production well in the ASP EOR process of the present invention: alkalis that are not highly buffered react with the formation, increasing the amount oil recovery formulation and time required for the oil recovery formulation to breakthrough from an injection well to a production well.

Preferably the ammonia liquid and the alkali metal carbonate or bicarbonate are mixed with the other components of the oil recovery formulation, or are present in the oil recovery formulation, in an amount sufficient to provide the oil recovery formulation with an initial pH of from 10 to 12. The ammonia liquid may be mixed with the other components of the oil recovery formulation, or may be present in the oil recovery formulation, in an amount to provide ammonia in a concentration in the oil recovery formulation of from 0.01M to 2M, or from 0.1M to 1 M, or in an amount that is from 0.01 wt. % to 5 wt. %, or from 0.1 wt. % to 2 wt. %, of the total combined weight of the surfactant, polymer, alkali metal carbonate or bicarbonate, ammonia liquid, and water of the oil recovery formulation.

The alkali metal carbonate or bicarbonate may be mixed with the other components of the oil recovery formulation, or may be present in the oil recovery formulation, in an amount sufficent to provide the oil recovery formulation with an initial pH of from 10-12 in combination with the ammonia liquid. The alkali metal carbonate or bicarbonate may be present in the oil recovery formulation in at least an amount sufficient to precipitate a significant amount of calcium cations instantaneously contacted by the oil recovery formulation in the formation, preferably at least 50%, or at least 75%, or at least 90%, or at least 95%, or at least 99%, or substantially all, or 100% of the calcium cations instantaneously contacted by the oil recovery formulation in the formation. Preferably, the amount of alkali metal carbonate or bicarbonate mixed with other components of the oil recovery formulation, or present in the oil recovery formulation, is limited to an amount of at most 10 times, or at most 5 times, or at most 1 times that required to precipitate 100% of calcium cations in the formation that may be instantaneously contacted with the oil recovery formulation. The amount of alkali metal carbonate or alkali metal bicarbonate mixed with other components of the oil recovery formulation, or present in the oil recovery formulation, may be from 0.001 wt. % to 2 wt. %, or from 0.01 wt. % to 1 wt. %, from 0.05 wt. % to 0.5 wt. % of the total combined weight of the surfactant, polymer, alkali metal carbonate or bicarbonate, ammonia liquid, and water of the oil recovery formulation.

The amount of alkali metal carbonate or alkali metal bicarbonate sufficient to precipitate 100% of the calcium cations in the formation instantaneously contacted by the oil recovery formulation in the formation may be directly reasonably approximated if the formation contains connate water or formation brine containing insignificant quantities of calcium (e.g. at most 200 ppm calcium) that would precipitate as calcium salts upon contact with the alkali metal carbonate or bicarbonate. In an embodiment of the process of the present invention, if the formation contains connate water or formation brine having a calcium content of greater than 200 ppm, the formation may be treated with a softened brine having a calcium content of at most 10 ppm prior to contact with the oil recovery formulation so that alkali of the alkali metal carbonate or bicarbonate is not substantially precipitated as calcium salts formed by contact with calcium contained in solution in the connate water or formation brine.

When the formation contains connate water or formation brine containing insignificant quantities of calcium, calcium cations present in the formation that may be instantaneously contacted by the oil recovery formation are primarily located on cation binding ion exchange sites within the formation. Since a negligible amount of multivalent cations having a valency of 3 or greater are present in a formation relative to monovalent and divalent cations, a reasonable approximation of the concentration of calcium cations on cation binding sites in a formation may be determined. The concentration of all monovalent cations and all divalent cations (in equivalents) present in the formation water may be measured, and the fraction of formation rock ion exchange sites that are binding divalent cations and that are to be swept by the oil recovery formulation may be calculated according to equations 1 and 2.

$$(++)_r = \frac{(k+2) - \sqrt{k^2 + 4k}}{2} \quad \text{(equation 1)}$$

where $$k = \left[\frac{[+]_w^2}{[++]_w}\right] * P.V. \quad \text{(equation 2)}$$

where P. V. is the fractional pore volume of the oil recovery formulation to be utilized to sweep the formation, where subscript (w) indicates an ion in formation water and subscript (r) indicates a formation rock site occupied by a ion, and $[+]_w$ indicates monovalent cation concentration (in equivalents) in formation water, $[++]_w$ indicates divalent cation concentration (in equivalents) in formation water, and $(++)_r$ indicates the fraction of formation rock ion exchange sites that are occupied by a divalent cation where $$(++)_r = \frac{(\text{equivalents}++)_r}{\{(\text{equivalents}++)_r + (\text{equivalents}+)_r\}}.$$

The fraction of formation rock ion exchange sites occupied by calcium cations $((Ca^{2+})_r)$ and that are to be swept by the oil recovery formulation may be calculated by measuring the concentration of calcium ions in the formation water, calculating the ratio of calcium ion concentration in the formation water to total divalent cation concentration in the formation water, and multiplying the calculated fraction of formation rock ion exchange sites to be swept by the oil recovery formulation that are binding divalent cations by the calculated ratio of calcium cations in the formation water to the total divalent cations in the formation water as shown in equation (3):

$$(Ca^{2+})_r = (++)_r * ([Ca^{2+}]_w / [++]_w) \quad \text{(equation 3)}.$$

The concentration of calcium cations per volume of the formation may be determined by measuring the grain density, the porosity, and the cation exchange capacity (CEC) of the formation, calculating the volume of pore space in the formation rock according to equation (4)

$$V_{\text{pore space per 100 grams formation rock}} = \left(\frac{100\ g}{\text{Grain Density}}\right) * \left(\frac{\text{Porosity}}{(1 - \text{Porosity})}\right). \quad \text{(equation 4)}$$

calculating the cation exchange capacity of the formation per volume of the formation according to equation (5)

$$CEC_{per\ volume\ of\ formation\ (meq/ml\ of\ pore\ space)} = \frac{CEC_{formation}\left(\frac{meq}{100\ g}\right)}{V_{pore\ space\ per\ 100\ grams\ formation\ rock}},\quad \text{(equation 5)}$$

and calculating the concentration of calcium cations (in milliequivalents) per volume of the formation according to equation (6):

$$[Ca^{2+}]_{per\ volume\ of\ formation\ (meq/ml)} = CEC_{per\ volume\ of\ formation} *(Ca^{2+})_{r(Ca2+\ fraction\ on\ formation\ rock\ ion\ exchange\ sites)}\quad \text{(equation 6)}.$$

The concentration of alkali carbonate in milliequivalents per milliliter of an oil recovery formulation containing 1 wt % of the alkali carbonate in solution may be calculated according to equation (7), assuming the oil recovery formulation has a density of about 1 (a good approximation for dilute aqueous solutions):

$$[Alk.\ Carbonate]_{per\ volume\ oil\ recovery\ formation}(meq/ml) = 2*\left[\frac{(1(wt\ \%)\ Alk.\ Carbonate\ formulation)*10}{Molecular\ Wt.\ of\ Alkali\ Carbonate}\right].\quad \text{(equation 7)}$$

The approximate amount of alkali carbonate (wt. %) in the oil recovery formulation required to precipitate all of the calcium in the formation in a volume swept by the oil recovery formulation may then be calculated based on the fractional pore volume (P. V.) of oil recovery formulation used to sweep the formation, and the concentration of calcium ions per volume of the formation (meq/ml) and the concentration of alkali carbonate at 1% concentration (meq/ml) per volume of oil recovery formulation according to equation (8):

$$\frac{Alkali\ carbonate\ required\ in\ oil\ recovery\ formulation\ (wt\ \%)}{=} \frac{[Ca2+]\ per\ volume\ of\ formation}{([1\ wt\ \%\ Alk.\ Carbonate]\ per\ volume\ oil\ recovery\ formulation*P.V.\ of\ oil\ recovery\ formulation}.\quad \text{(equation 8)}$$

The oil recovery formulation further comprises a surfactant, where the surfactant may be any surfactant effective to reduce the interfacial tension between oil and water in the oil-bearing formation and thereby mobilize the oil for production from the formation. The surfactant may be mixed with other components of the enhanced oil recovery formulation to form the enhanced oil recovery formulation, where the surfactant may be mixed with the other enhanced oil recovery formulation components 1) prior to introduction of the enhanced oil recovery formulation to the oil-bearing formation, or 2) after one or more of the enhanced oil recovery formulation components have been individually introduced into the formation, or 3) simultaneously with introduction of one or more of the enhanced oil recovery formulation components into the formation, but separate from at least one of the components. The oil recovery formulation may comprise one or more surfactants. The surfactant may be an anionic surfactant. The anionic surfactant may be a sulfonate-containing compound, a sulfate-containing compound, a carboxylate compound, a phosphate compound, or a blend thereof. The anionic surfactant may be an alpha olefin sulfonate compound, an internal olefin sulfonate compound, a branched alkyl benzene sulfonate compound, a propylene oxide sulfate compound, an ethylene oxide sulfate compound, a propylene oxide-ethylene oxide sulfate compound, or a blend thereof. The anionic surfactant may be a surfactant that forms a water insoluble calcium salt in the presence of calcium cations. The anionic surfactant may be stable at temperatures of from 50° C. to 90° C., or from 60° C. to 75° C. The anionic surfactant may contain from 12 to 28 carbons, or from 12 to 20 carbons. The surfactant of the oil recovery formulation may comprise an internal olefin sulfonate compound containing from 15 to 18 carbons or a propylene oxide sulfate compound containing from 12 to 15 carbons, or a blend thereof, where the blend contains a volume ratio of the propylene oxide sulfate to the internal olefin sulfonate compound of from 1:1 to 10:1.

The oil recovery formulation may contain an amount of the surfactant effective to reduce the interfacial tension between oil and water in the formation and thereby mobilize the oil for production from the formation. The oil recovery formulation may contain from 0.05 wt. % to 5 wt. % of the surfactant or combination of surfactants, or may contain from 0.1 wt. % to 3 wt. % of the surfactant or combination of surfactants.

The oil recovery formulation further comprises a polymer, where the polymer may provide the oil recovery formulation with a viscosity on the same order of magnitude as the viscosity of oil in the formation under formation temperature conditions so the oil recovery formulation may drive mobilized oil across the formation for production from the formation with a minimum of fingering of the oil through the oil recovery formulation and/or fingering of the oil recovery formulation through the oil. The polymer may be in an aqueous solution or an aqueous dispersion prior to being mixed to form the enhanced oil recovery formulation. The polymer may be mixed with other components of the enhanced oil recovery formulation to form the enhanced oil recovery formulation, where the polymer may be mixed with the other enhanced oil recovery formulation components 1) prior to introduction of the enhanced oil recovery formulation to the oil-bearing formation, or 2) after one or more of the enhanced oil recovery formulation components have been individually introduced into the formation, or 3) simultaneously with introduction of one or more of the enhanced oil recovery formulation components into the formation, but separate from at least one of the components.

The oil recovery formulation may comprise a polymer selected from the group consisting of polyacrylamides, partially hydrolyzed polyacrylamides, polyacrylates, ethylenic co-polymers, biopolymers, carboxymethylcelluloses, polyvinyl alcohols, polystyrene sulfonates, polyvinylpyrrolidones, AMPS (2-acrylamide-methyl propane sulfonate), and combinations thereof. Examples of ethylenic co-polymers include co-polymers of acrylic acid and acrylamide, acrylic acid and lauryl acrylate, and lauryl acrylate and acrylamide. Examples of biopolymers include xanthan gum and guar gum.

The quantity of polymer in the oil recovery formulation should be sufficient to provide the oil recovery formulation with a viscosity sufficient to drive the oil through the oil-bearing formation with a minimum of mobilized oil fingering through the oil recovery formulation and, optionally, a minimum of fingering of the oil recovery formulation through the mobilized oil. The quantity of the polymer in the oil recovery formulation may be sufficient to provide the oil recovery formulation with a dynamic viscosity at formation temperatures on the same order of magnitude, or, less preferably a greater order of magnitude, as the dynamic viscosity of the oil in the oil-bearing formation at formation temperatures so the oil recovery formulation may push the oil through the formation. In a preferred embodiment, the oil recovery formulation may have a dynamic viscosity within 400%, or within 300%, or within 200% of the dynamic viscosity of the oil in the oil-bearing formation when measured isothermally. The quantity of the polymer in the oil recovery formulation may be sufficient to provide the oil recovery formulation with a dynamic viscosity of at least 1 mPa s (1 cP), or at least 10 mPa s (10 cP), or at least 50 mPa s (50 cP), or at least 100 mPa s (100 cP) at 25° C. or at a temperature within a formation temperature range. The concentration of polymer in the oil recovery formulation may be from 200 ppm to 10000 ppm, or from 500 ppm to 5000 ppm, or from 1000 to 2500 ppm.

The molecular weight average of the polymer in the oil recovery formulation should be sufficient to provide sufficient viscosity to the oil recovery formulation to drive the mobilized oil through the formation. The polymer may have a molecular weight average of from 10,000 to 30,000,000 daltons, or from 100,000 to 10,000,000 daltons.

In one aspect, the present invention is directed to an oil recovery formulation composition comprising water, ammonia, an alkali metal carbonate and/or bicarbonate, a surfactant, and a polymer. The water, ammonia, alkali metal carbonate and/or bicarbonate, surfactant, and polymer may be as described above. The oil recovery formulation composition may contain an amount of ammonia liquid comprising at most 10 wt. % water, preferably anhydrous liquid ammonia, in an amount effective to provide the oil recovery formulation with an initial pH of from 10 to 12, or an ammonia concentration of from 0.01M to 2 M, or from 0.01 wt. % to 5 wt. % ammonia; from 0.001 wt. % to 2 wt. % or from 0.01 wt. % to 1 wt. %, or from 0.05 wt. % to 0.5 wt. % of an alkali metal carbonate and/or bicarbonate; from 0.05 wt. % to 5 wt. %, or from 0.1 wt. % to 3 wt. % of the surfactant or combination of surfactants; and from 200 ppm to 10000 ppm, or from 500 ppm to 5000 ppm, or from 1000 to 2500 ppm of the polymer or a combination of polymers.

In the method of the present invention, the oil recovery formulation is, or components of the oil recovery formulation are, introduced into an oil-bearing formation, and the system of the present invention includes an oil-bearing formation. The oil-bearing formation comprises oil that may be separated and produced from the formation after contact and mixing with the oil recovery formulation. The oil of the oil-bearing formation may contain oil having a total acid number (TAN) expressed in milligrams of KOH per gram of sample of at least 0.1 or at least 0.3 or at least 0.5, wherein the TAN of an oil may be determined in accordance with ASTM Method D664. Oils having a TAN of at least 0.1 contain significant quantities of acidic moieties that may interact with ammonia and/or an alkali metal carbonate or bicarbonate to form a soap when treated with an oil recovery formulation comprising ammonia and an alkali metal carbonate and/or bicarbonate, thereby reducing interfacial tension between oil and water in the formation and mobilizing the oil for production from the formation.

The oil contained in the oil-bearing formation may be a light oil or an intermediate weight oil containing less than 25 wt. %, or less than 20 wt. %, or less than 15 wt. %, or less than 10 wt. %, or less than 5 wt. % of hydrocarbons having a boiling point of at least 538° C. (1000° F.) and having an API gravity as determined in accordance with ASTM Method D6882 of at least 20°, or at least 25°, or at least 30°. Alternatively, but less preferably, the oil of the oil bearing-formation may be a heavy oil containing more than 25 wt. % of hydrocarbons having a boiling point of at least 538° C. and having an API gravity of less than 20°.

The oil contained in the oil-bearing formation may have a dynamic viscosity under formation conditions (in particular, at temperatures within the temperature range of the formation) of at least 0.4 mPa s (0.4 cP), or at least 10 mPa s (10 cP), or at least 100 mPa s (100 cP), or at least 1000 mPa s (1000 cP), or at least 10000 mPa s (10000 cP). The oil contained in the oil-bearing formation may have a dynamic viscosity under formation temperature conditions of from 0.4 to 10000000 mPa s (0.4 to 10000000 cP).

The oil-bearing formation may be a subterranean formation. The subterranean formation may be comprised of one or more porous matrix materials selected from the group consisting of a porous mineral matrix, a porous rock matrix, and a combination of a porous mineral matrix and a porous rock matrix, where the porous matrix material may be located beneath an overburden at a depth ranging from 50 meters to 6000 meters, or from 100 meters to 4000 meters, or from 200 meters to 2000 meters under the earth's surface.

The subterranean formation may be a subsea subterranean formation. The method and system of the present invention may be particularly suited for recovering oil from an oil-bearing subsea subterranean formation utilizing an offshore oil recovery platform.

The porous matrix material may be a consolidated matrix material in which at least a majority, and preferably substantially all, of the rock and/or mineral that forms the matrix material is consolidated such that the rock and/or mineral forms a mass in which substantially all of the rock and/or mineral is immobile when oil, the oil recovery formulation, water, or other fluid is passed therethrough. Preferably at least 95 wt. % or at least 97 wt. %, or at least 99 wt. % of the rock and/or mineral is immobile when oil, the oil recovery formulation, water, or other fluid is passed therethrough so that any amount of rock or mineral material dislodged by the passage of the oil, oil recovery formulation, water, or other fluid is insufficient to render the formation impermeable to the flow of the oil recovery formulation, oil, water, or other fluid through the formation. The porous matrix material may be an unconsolidated matrix material in which at least a majority, or substantially all, of the rock and/or mineral that forms the matrix material is unconsolidated. The formation may have a permeability of from 0.0001 to 15 Darcys, or from 0.001 to 1 Darcy. The rock and/or mineral porous matrix material of the formation may be comprised of sandstone and/or a carbonate selected from dolomite, limestone, and mixtures thereof—where the limestone may be microcrystalline or crystalline limestone and/or chalk. The rock and/or mineral porous matrix material of the formation may include significant quantities of silica quartz since the alkalinity of the ammonia based oil recovery formulation may be sufficiently low to avoid dissolution of the silica-quartz.

Oil in the oil-bearing formation may be located in pores within the porous matrix material of the formation. The oil in the oil-bearing formation may be immobilized in the pores within the porous matrix material of the formation, for example, by capillary forces, by interaction of the oil with the pore surfaces, by the viscosity of the oil, or by interfacial tension between the oil and water in the formation.

The oil-bearing formation may also be comprised of water, which may be located in pores within the porous matrix material. The water in the formation may be connate water, water from a secondary or tertiary oil recovery process water-flood, or a mixture thereof. The water in the oil-bearing formation may be positioned in the formation to immobilize oil within the pores. Contact of the oil recovery formulation with the oil and water in the formation may mobilize the oil in the formation for production and recovery from the formation by freeing at least a portion of the oil from pores within the formation by reducing interfacial tension between water and oil in the formation.

In some embodiments, the oil-bearing formation may comprise unconsolidated sand and water. The oil-bearing formation may be an oil sand formation. In some embodiments, the oil may comprise between about 1 wt. % and about 16 wt. % of the oil/sand/water mixture, the sand may comprise between about 80 wt. % and about 85 wt. % of the oil/sand/water mixture, and the water may comprise between about 1 wt. % and about 16 wt. % of the oil/sand water mixture. The sand may be coated with a layer of water with the petroleum being located in the void space around the wetted sand grains. Optionally, the oil-bearing formation may also include a gas, such as methane or air, for example.

The oil-bearing formation may be comprised of calcium cations and/or calcium compounds or salts from which calcium cations may be displaced. The calcium cations and/or calcium compounds or salts from which calcium cations may be displaced may be present in the connate water within the formation. The calcium cations may be present in the connate water in a concentration of from 10 ppm to 30,000 ppm. The calcium cations and/or calcium compounds or salts from which calcium cations may be displaced may be present in porous matrix material of the formation, as described above.

Figure 1:
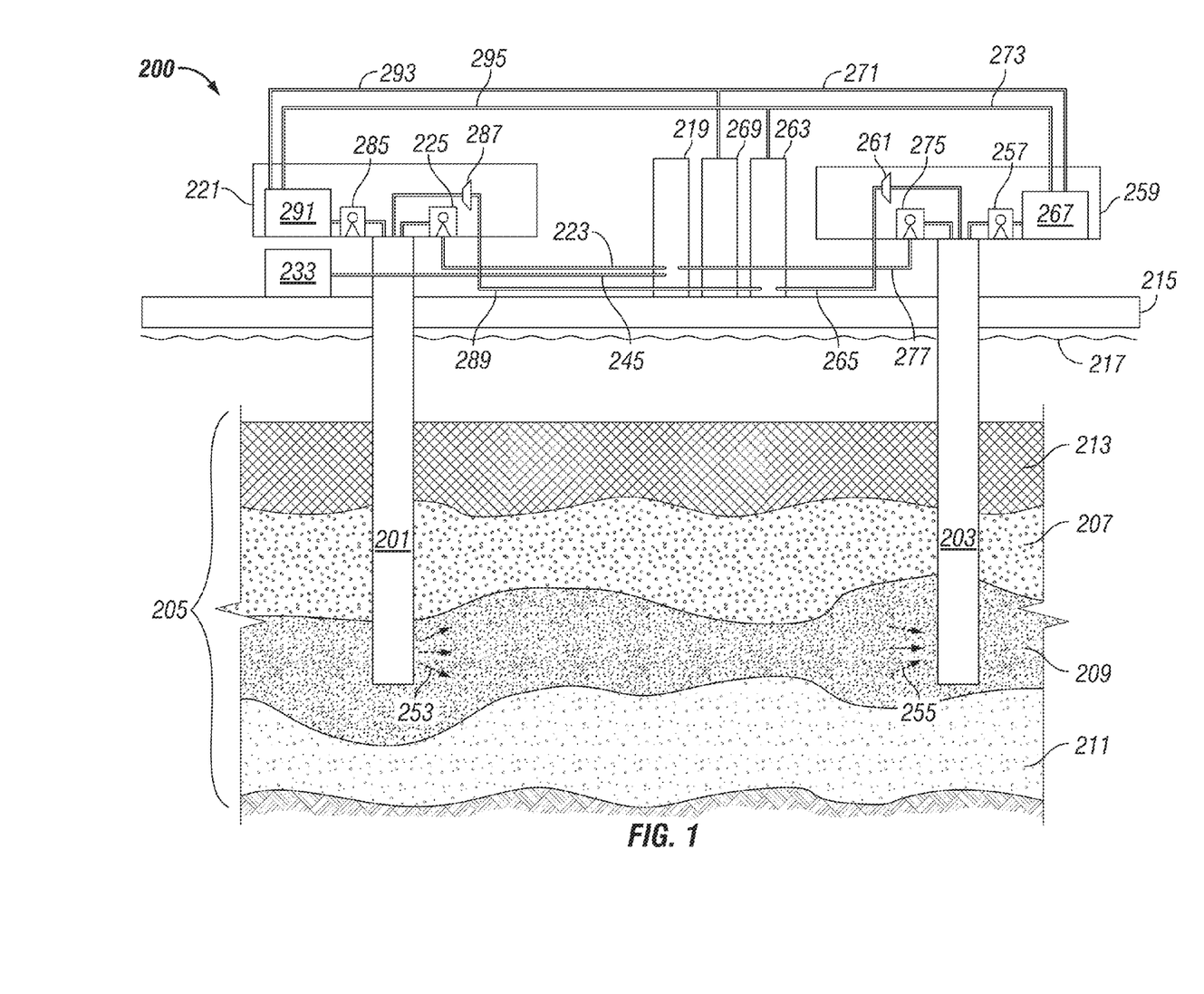
FIG. 1 is an illustration of an oil production system in accordance with the present invention that may be utilized to recover oil by a process in accordance with the present invention.

Referring now to FIG. 1, a system 200 of the present invention for practicing a method of the present invention is shown. The system includes a first well 201 and a second well 203 extending into an oil-bearing formation 205 such as described above. The oil-bearing formation 205 may be comprised of one or more formation portions 207, 209, and 211 formed of porous material matricies, such as described above, located beneath an overburden 213. The oil-bearing formation 205 may be a subsea formation where the first well 201 and the second well 203 may extend from one or more offshore platforms 215 located on the surface of the sea 217 above the oil-bearing formation 205.

In an embodiment, the system includes an oil recovery formulation comprising water as described above, ammonia as described above, an alkali metal carbonate or bicarbonate as described above, a surfactant as described above, and a polymer as described above. The salinity of the oil recovery formulation may be selected and/or adjusted to optimize the interfacial tension reducing capacity of the surfactant and/or the ammonia and/or the alkali metal carbonate or bicarbonate of the oil recovery formulation with oil in the oil-bearing formation, and/or to optimize the viscosity of the oil recovery formulation, as described above. The oil recovery formulation may be provided from an oil recovery formulation storage facility 219 fluidly operatively coupled to a first injection/production facility 221 via conduit 223. First injection/production facility 221 may be fluidly operatively coupled to the first well 201, which may be located extending from the first injection/production facility 221 into the oil-bearing formation 205. The oil recovery formulation may flow from the first injection/production facility 221 through the first well 201 to be introduced into the formation 205, for example in formation portion 209, where the first injection/production facility 221 and the first well, or the first well itself, include(s) a mechanism for introducing the oil recovery formulation into the formation. Alternatively, the oil recovery formulation may flow from the oil recovery formulation storage facility 219 directly to the first well 201 for injection into the formation 205, where the first well may comprise a mechanism for introducing the oil recovery formulation into the formation. The mechanism for introducing the oil recovery formulation into the formation 205 via the first well 201—located in the first injection/production facility 221, the first well 201, or both—may be comprised of a pump 225 for delivering the oil recovery formulation to perforations or openings in the first well through which the oil recovery formulation may be introduced into the formation.

Figure 2:
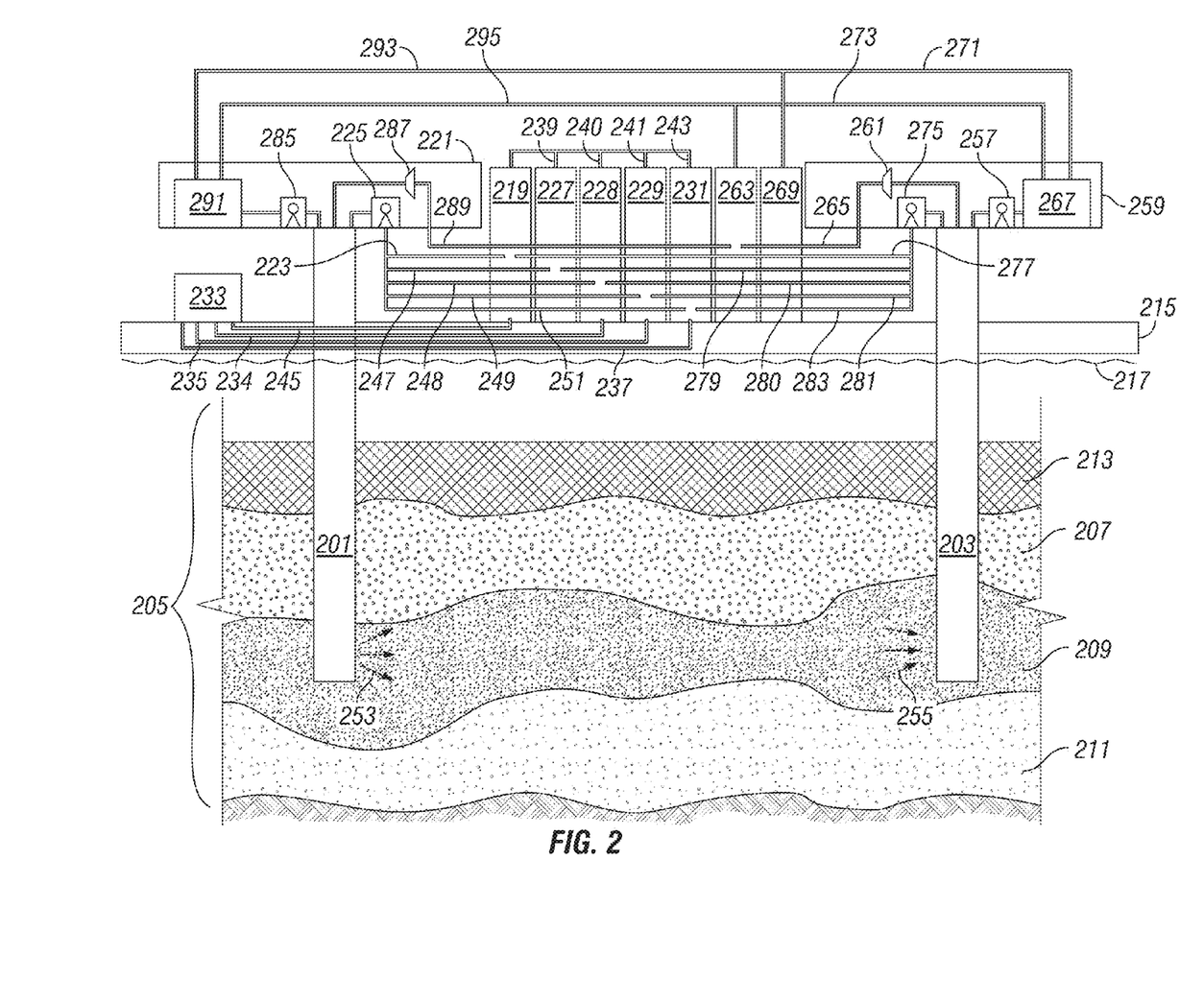
FIG. 2 is an illustration of an oil production system in accordance with the present invention that may be utilized to recover oil by a process in accordance with the present invention.

In another embodiment as shown in FIG. 2, the system may include separate storage facilities for one or more of the ammonia liquid, alkali metal carbonate or bicarbonate, surfactant, and polymer of the enhanced oil recovery formulation. The ammonia liquid may be stored in an ammonia liquid storage facility 227, and may contain up to 10 wt. % water, or up to 5 wt. % water, or may be anhydrous liquid ammonia. The alkali metal carbonate or bicarbonate, either as an aqueous solution or as a solid material, may be stored in an alkali metal carbonate or bicarbonate storage facility 228. The surfactant may be stored in a surfactant storage facility 229, and may be an anionic surfactant as described above. The polymer may be stored in a polymer storage facility 231, and may be a polymer as described above.

Water may be provided from source water—for example sea water, produced formation water, lake water, aquifer water, or river water—treated in a water treatment facility 233 to adjust the salinity of the water to an optimum salinity for use in the oil recovery formulation as described above. The water treatment facility may be operatively fluidly coupled to the alkai carbonate or bicarbonate storage facility 228 via conduit 234 to provide water for mixing with the alkali metal carbonate or bicarbonate, if necessary; and/or may be operatively fluidly coupled to the surfactant storage facility 229 via conduit 235 to provide water for mixing with the surfactant to form a solution of the surfactant; and/or may be operatively fluidly coupled to the polymer storage facility 231 via conduit 237 to provide water for mixing with the polymer to form a solution of the polymer. Alternatively, the alkali metal carbonate or bicarbonate stored in the alkali metal carbonate or bicarbonate storage facility 228 may be a pre-mixed aqueous alkali metal carbonate or bicarbonate solution, and/or the surfactant stored in the surfactant storage facility 229 may be a pre-mixed aqueous surfactant solution, and/or the polymer stored in the polymer storage facility 231 may be a pre-mixed aqueous polymer solution.

The ammonia liquid, alkali metal carbonate or bicarbonate, surfactant, and polymer may be provided from the ammonia liquid storage facility 227, the alkali metal carbonate or bicarbonate storage facility 228, the surfactant storage facility 229, and the polymer storage facility 231, respectively, to the oil recovery formulation storage facility 219 wherein the ammonia liquid, the alkali metal carbonate or bicarbonate, the surfactant, and the polymer may be mixed and stored as the oil recovery formulation. The ammonia liquid storage facility 227 may be operatively fluidly coupled to the oil recovery formulation storage facility 219 by conduit 239; the alkali metal carbonate or bicarbonate storage facility 228 may be fluidly operatively coupled to the oil recovery formulation storage facility by conduit 240; the surfactant storage facility 229 may be operatively fluidly coupled to the oil recovery formulation storage facility by conduit 241; and the polymer storage facility 231 may be operatively fluidly coupled to the oil recovery formulation storage facility by conduit 243. Water for the oil recovery formulation, if necessary, may be provided from source water treated in the water treatment facility 233, wherein the water treatment facility may be operatively fluidly coupled to the oil recovery formulation storage facility 219 by conduit 245.

The oil recovery formulation may be provided from the oil recovery formulation storage facility 219 to the first injection/production facility 221 or to the first well 201 for injection into the formation 205 as described above.

Alternatively, the ammonia liquid, the alkali metal carbonate or bicarbonate, the surfactant, and the polymer may be provided separately from the ammonia liquid storage facility 227, the alkali metal carbonate or bicarbonate storage facility 228, the surfactant storage facility 229, and the polymer storage facility 231, respectively, to the first injection/production facility 221 or to the first well 201 for injection into the formation 205. The ammonia liquid storage facility 227 may be fluidly operatively coupled to the first injection/production facility 221 or the first well 201 by conduit 247; the alkali metal carbonate or bicarbonate storage facility 228 may be fluidly operatively coupled or coupled for powdered solid flow to the first injection/production facility or the first well by conduit 248, the surfactant storage facility 229 may be fluidly operatively coupled to the first injection/production facility or the first well by conduit 249; and the polymer storage facility 231 may be fluidly operatively coupled to the first injection/production facility or the first well by conduit 251 Ammonia liquid, one or more alkali metal carbonate or bicarbonate compounds, one or more surfactants, and/or one or more polymers, and optionally water, may be provided separately to the first injection/production facility 221 or the first well 201 and may be mixed in the first injection/production facility or the first well to form the oil recovery formulation for injection into the formation. Alternatively the ammonia liquid, one or more alkali metal carbonate or bicarbonate compounds, one or more surfactants, one or more polymers, and optionally additional water, may be injected into the formation 205 via the first well 201 separately or in a combination that does not form the complete oil recovery formulation, and the ammonia liquid, one or more alkali metal carbonate or bicarbonate compounds, one or more surfactants, one or more polymers, and optionally water, may be mixed to form the oil recovery formulation within the formation, where the oil recovery formulation formed within the formation may then be contacted with oil in the formation to mobilize the oil for production from the formation.

Referring now to both FIGS. 1 and 2, the oil recovery formulation may be introduced into the formation 205, for example by injecting the oil recovery formulation into the formation through the first well 201 by pumping the oil recovery formulation through the first well and into the formation, or by pumping the components of the oil recovery formulation through the first well into the formation for mixing within the formation to form the oil recovery formulation in situ. The pressure at which the oil recovery formulation or the components of the oil recovery formulation is/are introduced into the formation may range from the instantaneous pressure in the formation up to, but not including, the fracture pressure of the formation. The pressure at which the oil recovery formulation or its components may be injected into the formation may range from 20% to 95%, or from 40% to 90%, of the fracture pressure of the formation. Alternatively, the oil recovery formulation or its components may be injected into the formation at a pressure equal to, or greater than, the fracture pressure of the formation.

The volume of oil recovery formulation or combined components of the oil recovery formulation introduced into the formation 205 via the first well 201 may range from 0.001 to 5 pore volumes, or from 0.01 to 2 pore volumes, or from 0.1 to 1 pore volumes, or from 0.2 to 0.6 pore volumes, where the term "pore volume" refers to the volume of the formation that may be swept by the oil recovery formulation or combined components of the oil recovery formulation between the first well 201 and the second well 203. The pore volume may be readily be determined by methods known to a person skilled in the art, for example by modeling studies or by injecting water having a tracer contained therein through the formation 205 from the first well 201 to the second well 203.

As the oil recovery formulation is introduced into the formation 205 or as the components of the oil recovery formulation are individually introduced into the formation and mixed therein to form the oil recovery formulation, the oil recovery formulation spreads into the formation as shown by arrows 253. Upon introduction to the formation 205 or upon mixing of components of the oil recovery formulation in the formation to form the oil recovery formulation, the oil recovery formulation contacts and forms a mixture with a portion of the oil in the formation. The oil recovery formulation may mobilize the oil in the formation upon contacting and mixing with the oil and water in the formation. The oil recovery formulation may mobilize the oil in the formation upon contacting and mixing with the oil, for example, by reducing capillary forces retaining the oil in pores in the formation, by reducing the wettability of the oil on pore surfaces in the formation, by reducing the interfacial tension between oil and water in the formation, and/or by forming a microemulsion with oil and water in the formation.

The mobilized mixture of the oil recovery formulation and oil and water may be pushed across the formation 205 from the first well 201 to the second well 203 by further introduction of more oil recovery formulation or components of the oil recovery formulation into the formation. The oil recovery formulation may be designed to displace the mobilized mixture of the oil recovery formulation and oil through the formation 205 for production at the second well 203. As described above, the oil recovery formulation contains a polymer, wherein the oil recovery formulation comprising the polymer may be designed to have a viscosity on the same order of magnitude as the viscosity of the oil in the formation under formation temperature conditions, so the oil recovery formulation may drive the mobilized mixture of oil recovery formulation, oil, and water across the formation while inhibiting fingering of the mixture of mobilized oil and oil recovery formulation through the driving plug of oil recovery formulation and inhibiting fingering of the driving plug of oil recovery formulation through the mixture of mobilized oil and oil recovery formulation.

Oil may be mobilized for production from the formation 205 via the second well 203 by introduction of the oil recovery formulation and/or its components into the formation, where the mobilized oil is driven through the formation for production from the second well as indicated by arrows 255 by introduction of the oil recovery formulation or components of the oil recovery formulation into the formation via the first well 201. The oil mobilized for production from the formation 205 may include the mobilized oil/oil recovery formulation mixture. Water and/or gas may also be mobilized for production from the formation 205 via the second well 203 by introduction of the oil recovery formulation or its components into the formation via the first well 201.

After introduction of the oil recovery formulation into the formation 205 via the first well 201, oil may be recovered and produced from the formation via the second well 203. The system of the present invention may include a mechanism located at the second well for recovering and producing the oil from the formation 205 subsequent to introduction of the oil recovery formulation or the components of the oil recovery formulation into the formation, and may include a mechanism located at the second well for recovering and producing the oil recovery formulation, water, and/or gas from the formation subsequent to introduction of the oil recovery formulation into the formation. The mechanism located at the second well 203 for recovering and producing the oil, and optionally for recovering and producing the oil recovery formulation, water, and/or gas may be comprised of a pump 257, which may be located in a second injection/production facility 259 and/or within the second well 203. The pump 257 may draw the oil, and optionally the oil recovery formulation, water, and/or gas from the formation 205 through perforations in the second well 203 to deliver the oil, and optionally the oil recovery formulation, water, and/or gas, to the second injection/production facility 259.

Alternatively, the mechanism for recovering and producing the oil—and optionally the oil recovery formulation, water, and/or gas—from the formation 205 may be comprised of a compressor 261 that may be located in the second injection/production facility 259. The compressor 261 may be fluidly operatively coupled to a gas storage tank 263 via conduit 265, and may compress gas from the gas storage tank for injection into the formation 205 through the second well 203. The compressor may compress the gas to a pressure sufficient to drive production of oil—and optionally the oil recovery formulation, water, and/or gas—from the formation via the second well 203, where the appropriate pressure may be determined by conventional methods known to those skilled in the art. The compressed gas may be injected into the formation from a different position on the second well 203 than the well position at which the oil—and optionally the oil recovery formulation, water, and/or gas—are produced from the formation, for example, the compressed gas may be injected into the formation at formation portion 207 while oil, oil recovery formulation, water, and/or gas are produced from the formation at formation portion 209.

Oil, optionally in a mixture with the oil recovery formulation, water, and/or gas may be drawn from the formation 205 as shown by arrows 255 and produced up the second well 203 to the second injection/production facility 259. The oil may be separated from the oil recovery formulation, water, and/or gas in a separation unit 267 located in the second injection/production facility 259 and operatively fluidly coupled to the mechanism 257 for producing oil and, optionally, the oil recovery formulation, water, and/or gas, from the formation. The separation unit 267 may be comprised of a conventional liquid-gas separator for separating gas from the oil, oil recovery formulation, and water; and a conventional hydrocarbon-water separator including a demulsification unit for separating the oil from water and water soluble components of the oil recovery formulation.

The separated produced oil may be provided from the separation unit 267 of the second injection/production facility 259 to an oil storage tank 269, which may be fluidly operatively coupled to the separation unit 267 of the second injection/production facility by conduit 271. The separated gas, if any, may be provided from the separation unit 267 of the second injection/production facility 259 to the gas storage tank 263, which may be fluidly operatively coupled to the separation unit 267 of the second injection/production facility 259 by conduit 273.

In an embodiment of a system and a method of the present invention, the first well 201 may be used for injecting the oil recovery formulation and/or its components into the formation 205 and the second well 203 may be used to produce oil from the formation as described above for a first time period, and the second well 203 may be used for injecting the oil recovery formulation and/or its components into the formation 205 to mobilize the oil in the formation and drive the mobilized oil across the formation to the first well and the first well 201 may be used to produce oil from the formation for a second time period, where the second time period is subsequent to the first time period. The second injection/production facility 259 may comprise a mechanism such as pump 275 that may be fluidly operatively coupled the oil recovery formulation storage facility 219 by conduit 277, and that is fluidly operatively coupled to the second well 203 to introduce the oil recovery formulation into the formation 205 via the second well. Alternatively, as shown in FIG. 2, the mechanism 275 may be fluidly operatively coupled to: the ammonia liquid storage facility 227 via conduit 279; the alkali metal carbonate or bicarbonate storage facility 228 via conduit 280; the surfactant storage facility 229 via conduit 281; and the polymer storage facility 231 by conduit 283 for introduction of the components of the oil recovery formulation into the formation via the second well 203. Referring again to FIGS. 1 and 2, the first injection/production facility 221 may comprise a mechanism such as pump 285, or compressor 287 fluidly operatively coupled to the gas storage tank 263 by conduit 289, for production of oil, and optionally the oil recovery formulation, water, and/or gas from the formation 205 via the first well 201. The first injection/production facility 221 may also include a separation unit 291 for separating produced oil, oil recovery formulation, water, and/or gas. The separation unit 291 may be comprised of a conventional liquid-gas separator for separating gas from the produced oil and water; and a conventional hydrocarbon-water separator for separating the produced oil from water and water soluble components of the oil recovery formulation, where the hydrocarbon-water separator may comprise a demulsifier. The separation unit 291 may be fluidly operatively coupled to: the oil storage tank 269 by conduit 293 for storage of produced oil in the oil storage tank; and the gas storage tank 263 by conduit 295 for storage of produced gas in the gas storage tank.

The first well 201 may be used for introducing the oil recovery formulation or the components of the oil recovery formulation into the formation 205 and the second well 203 may be used for producing oil from the formation for a first time period; then the second well 203 may be used for introducing the oil recovery formulation or components of the oil recovery formulation into the formation 205 and the first well 201 may be used for producing oil from the formation for a second time period; where the first and second time periods comprise a cycle. Multiple cycles may be conducted which include alternating the first well 201 and the second well 203 between introducing the oil recovery formulation or its components into the formation 205 and producing oil from the formation, where one well is introducing and the other is producing for the first time period, and then they are switched for a second time period. A cycle may be from about 12 hours to about 1 year, or from about 3 days to about 6 months, or from about 5 days to about 3 months.

Figure 3:
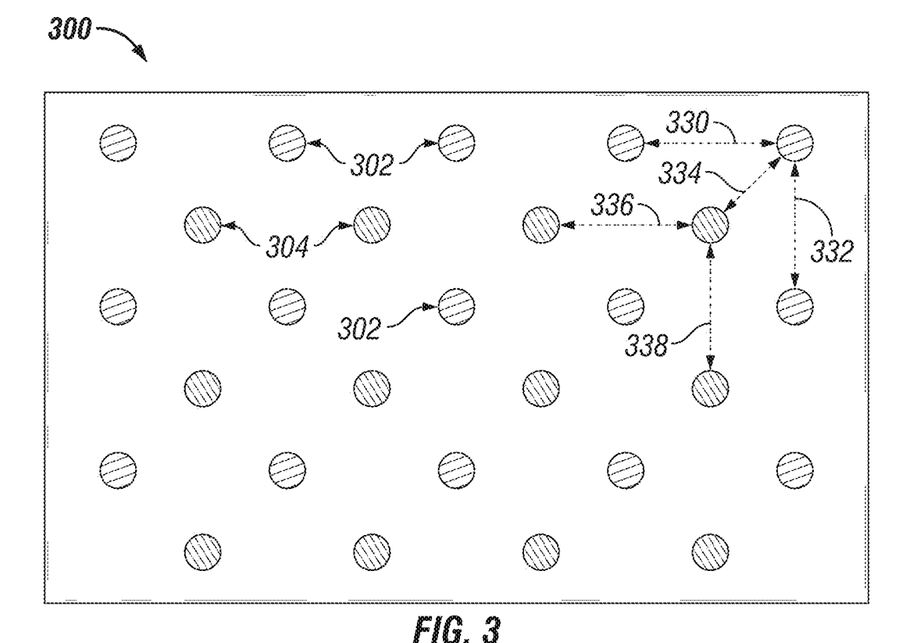
FIG. 3 is a diagram of a well pattern for production of oil in accordance with a system and process of the present invention.

Referring now to FIG. 3, an array of wells 300 is illustrated. Array 300 includes a first well group 302 (denoted by horizontal lines) and a second well group 304 (denoted by diagonal lines). In some embodiments of the system and method of the present invention, the first well of the system and method described above may include multiple first wells depicted as the first well group 302 in the array 300, and the second well of the system and method described above may include multiple second wells depicted as the second well group 304 in the array 300.

Each well in the first well group 302 may be a horizontal distance 330 from an adjacent well in the first well group 302. The horizontal distance 330 may be from about 5 to about 5000 meters, or from about 10 to about 1000 meters, or from about 20 to about 500 meters, or from about 30 to about 250 meters, or from about 50 to about 200 meters, or from about 90 to about 150 meters, or about 100 meters. Each well in the first well group 302 may be a vertical distance 332 from an adjacent well in the first well group 302. The vertical distance 332 may be from about 5 to about 5000 meters, or from about 10 to about 1000 meters, or from about 20 to about 500 meters, or from about 30 to about 250 meters, or from about 50 to about 200 meters, or from about 90 to about 150 meters, or about 100 meters.

Each well in the second well group 304 may be a horizontal distance 336 from an adjacent well in the second well group 304. The horizontal distance 336 may be from 5 to 5000 meters, or from 10 to 1000 meters, or from 20 to 500 meters, or from 30 to 250 meters, or from 50 to 200 meters, or from 90 to 150 meters, or about 100 meters. Each well in the second well group 304 may be a vertical distance 338 from an adjacent well in the second well group 304. The vertical distance 338 may be from 5 to 5000 meters, or from 10 to about 1000 meters, or from 20 to 500 meters, or from 30 to 250 meters, or from 50 to 200 meters, or from 90 to 150 meters, or about 100 meters.

Each well in the first well group 302 may be a distance 334 from the adjacent wells in the second well group 304. Each well in the second well group 304 may be a distance 334 from the adjacent wells in first well group 302. The distance 334 may be from 5 to 5000 meters, or from 10 to 1000 meters, or from 20 to 500 meters, or from 30 to 250 meters, or from 50 to 200 meters, or from 90 to 150 meters, or about 100 meters.

Each well in the first well group 302 may be surrounded by four wells in the second well group 304. Each well in the second well group 304 may be surrounded by four wells in the first well group 302.

In some embodiments, the array of wells 300 may have from 10 to 1000 wells, for example from 5 to 500 wells in the first well group 302, and from 5 to 500 wells in the second well group 304.

In some embodiments, the array of wells 300 may be seen as a top view with first well group 302 and the second well group 304 being vertical wells spaced on a piece of land. In some embodiments, the array of wells 300 may be seen as a cross-sectional side view of the formation with the first well group 302 and the second well group 304 being horizontal wells spaced within the formation.

Figure 4:
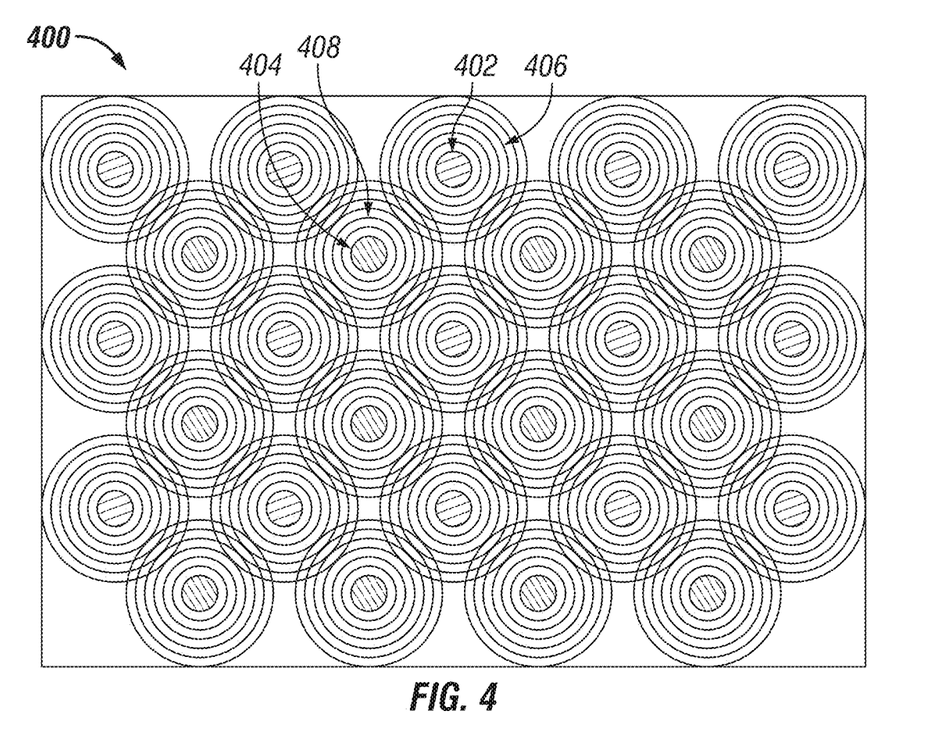
FIG. 4 is a diagram of a well pattern for production of oil in accordance with a system and process of the present invention.

Referring now to FIG. 4, an array of wells 400 is illustrated. Array 400 includes a first well group 402 (denoted by horizontal lines) and a second well group 404 (denoted by diagonal lines). The array 400 may be an array of wells as described above with respect to array 300 in FIG. 3. In some embodiments of the system and method of the present invention, the first well of the system and method described above may include multiple first wells depicted as the first well group 402 in the array 400, and the second well of the system and method described above may include multiple second wells depicted as the second well group 404 in the array 400.

The oil recovery formulation or components thereof may be injected into first well group 402 and oil may be recovered and produced from the second well group 404. As illustrated, the oil recovery formulation may have an injection profile 406, and oil may be produced from the second well group 404 having a oil recovery profile 408.

The oil recovery formulation or components thereof may be injected into the second well group 404 and oil may be produced from the first well group 402. As illustrated, the oil recovery formulation may have an injection profile 408, and oil may be produced from the first well group 402 having an oil recovery profile 406.

The first well group 402 may be used for injecting the oil recovery formulation or components thereof and the second well group 404 may be used for producing oil from the formation for a first time period; then second well group 404 may be used for injecting the oil recovery formulation or components thereof and the first well group 402 may be used for producing oil from the formation for a second time period, where the first and second time periods comprise a cycle. In some embodiments, multiple cycles may be conducted which include alternating first and second well groups 402 and 404 between injecting the oil recovery formulation or components thereof and producing oil from the formation, where one well group is injecting and the other is producing for a first time period, and then they are switched for a second time period.

to facilitate a better understanding of the present invention, the following examples of certain aspects of some embodiments are given. In no way should the following examples be read to limit, or define, the scope of the invention.

EXAMPLES

Comparative Example 1

A comparative example was conducted to show the effect of sodium carbonate on the formation of middle phase, type III, oil/water microemulsions at different brine concentrations when mixed with a surfactant and an isobutyl alcohol co-solvent.

As noted above, middle phase, type III, oil/water microemulsions exhibit very low interfacial tension between oil and water, and the formation of such microemulsions in an oil-bearing formation may enhance the mobilization of the oil for production from the formation due to reduction of interfacial tension between oil and water in the formation, where the extent of mobilization may be relative to the extent that interfacial tension is reduced. The interfacial tension between oil and water in which a middle phase, type III, microemulsion has formed is substantially lower than oil and water in which little or no microemulsion has formed, and is also significantly lower than the interfacial tension between oil and water in which a lower phase, type I, microemulsion has formed (where the microemulsion is an oil-in-water microemulsion residing in a lower water phase with nearly pure oil in an upper phase) or in which an upper phase, type II, microemulsion has formed (where the microemulsion is a water-in-oil microemulsion residing in an upper oil phase with nearly pure water in a lower phase). The interfacial tension of an aqueous surfactant system can be reliably estimated by measuring the volumes of phases that form from oil and brine at equilibrium. Ultra-low interfacial tension is evidenced by the formation of a third, middle (type III), microemulsion phase that exists between the oil phase and the water phase.

An oil recovery alkaline-surfactant solution was prepared by mixing sodium carbonate, a surfactant (PETROSTEP A-1, commercially available from Stepan Company), isobutyl alcohol, and deionized water. The solution contained 1.5 wt. % sodium carbonate, 0.75 wt. % surfactant, and 1 wt. % isobutyl alcohol, where water formed the rest of the solution. 10 samples containing 10 ml of this solution were prepared in 20 ml test tubes. Sodium chloride was added to nine of the samples so that the samples contained the amounts of sodium chloride shown in Table 2:

TABLE 2

| Sample # | NaCl (wt. %) |
|---|---|
| 1 | 0 |
| 2 | 0.1 |
| 3 | 0.2 |
| 4 | 0.3 |
| 5 | 0.4 |
| 6 | 0.5 |
| 7 | 0.6 |
| 8 | 0.7 |
| 9 | 0.8 |
| 10 | 0.9 |

Figure 5:
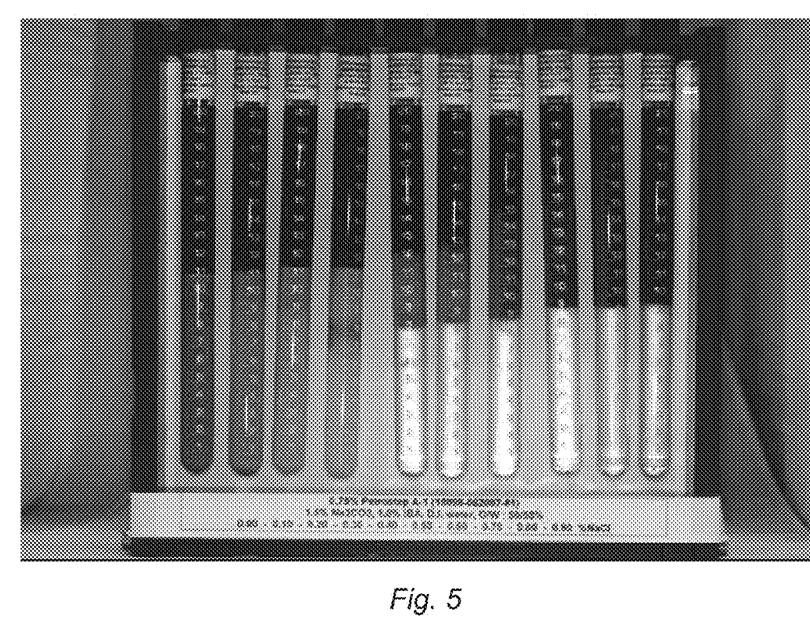
FIG. 5 is a photograph of equilibrated mixtures of aqueous sodium carbonate/surfactant solutions with oil at different brine concentrations.

10 ml of oil was added to each sample after dissolution of the sodium chloride in the solution. The samples were then shaken and subsequently stored at 70° C. for 1 hour. The samples were then shaken again and then allowed to equilibrate. After equilibration, the samples were visually inspected to determine the phase behavior of the samples. Samples 5-7 contained clearly visible middle phase microemulsions (type III). FIG. 5 shows a photograph of the samples after equilibration. The oil recovery solution containing sodium carbonate and a surfactant, therefore, was shown to form middle phase microemulsions at favorable brine concentrations, and would be useful to enhance oil recovery from a suitable oil-bearing formation by lowering the interfacial tension between oil and water in the formation and thereby mobilizing the oil for recovery.

Comparative Example 2

A comparative example was conducted to show the effect of ammonium hydroxide on the formation of middle phase, type III, oil/water microemulsions at different brine concentrations when mixed with a surfactant and an isobutyl alcohol co-solvent. An oil recovery alkaline-surfactant solution was prepared by mixing ammonium hydroxide, a surfactant (PETROSTEP A-1), isobutyl alcohol, and deionized water, where the ammonium hydroxide constituted 0.5 wt. % of the solution, the surfactant constituted 0.5 wt. % of the solution, and the isobutyl alcohol constituted 0.5 wt. % of the solution. 5 samples containing 10 ml of this solution were prepared in 20 ml test tubes. Sodium chloride was added to the samples so that the samples contained the amounts of sodium chloride shown in Table 3:

TABLE 3

| Sample # | NaCl (wt. %) |
|---|---|
| 1 | 1.25 |
| 2 | 1.50 |
| 3 | 1.75 |
| 4 | 2.00 |
| 5 | 2.25 |

Figure 6:
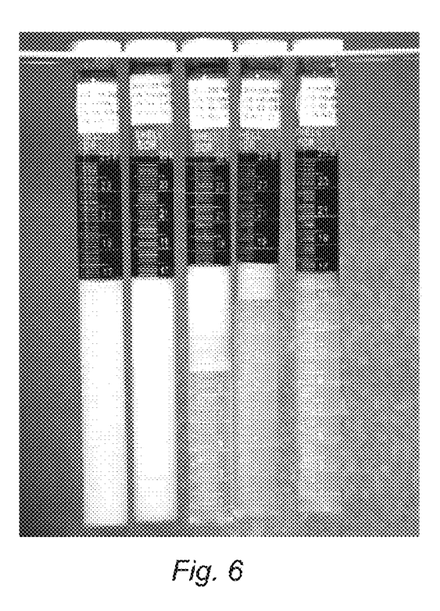
FIG. 6 is a photograph of equilibrated mixtures of aqueous ammonium hydroxide/surfactant solutions with oil at different brine concentrations.

10 ml of oil was added to each sample after dissolution of the sodium chloride in the solution. The samples were then shaken and subsequently stored at 70° C. for 1 hour. The samples were then shaken again and then allowed to equilibrate. After equilibration, the samples were visually inspected to determine the phase behavior of the samples. Sample 3 contained a clearly visible middle phase microemulsion (type III). FIG. 6 shows a photograph of the samples after equilibration. The oil recovery solution containing ammonium hydroxide and a surfactant, therefore, was shown to form a middle phase microemulsion at favorable brine concentrations, and would be useful to enhance oil recovery from a suitable oil-bearing formation by lowering the interfacial tension between oil and water in the formation and thereby mobilizing the oil for recovery.

Comparative Example 3

A comparative example was conducted to show the effect of calcium on the formation of middle phase, type III, oil/water microemulsions at different brine concentrations of ammonium hydroxide mixed with a surfactant and an isobutyl alcohol co-solvent. The experiment conducted in Comparative Example 2 was repeated except that 1000 ppm of calcium ion added as $CaCl_2$ (basis the oil recovery solution of ammonium hydroxide, surfactant, isobutyl alcohol, and deionized water) was added to the oil recovery solution together with sodium chloride.

Figure 7:
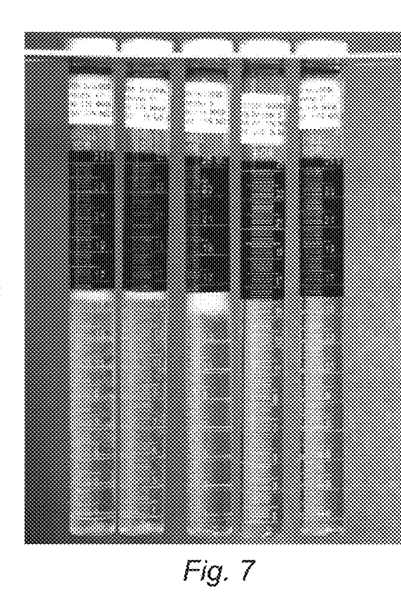
FIG. 7 is a photograph of equilibrated mixtures of aqueous ammonium hydroxide/surfactant solution with oil at different brine concentrations in the presence of $CaCl_2$.

Visual observation indicated that none of the samples contained a visible middle phase microemulsion, indicating that the presence of calcium interferes with the formation of a middle phase microemulsion when ammonium hydroxide is used as the alkaline component of an alkaline/surfactant oil recovery formulation and may inhibit minimizing the interfacial tension between oil and water. FIG. 7 shows a photograph of the samples after equilibration.

Illustrative Example

An illustrative example was conducted to show the effectiveness of an alkaline surfactant solution containing ammonium hydroxide, sodium carbonate, a surfactant, isobutyl alcohol, and deionized water to form middle phase, type III, oil/water microemulsions at different brine concentrations in the presence of calcium when mixed with oil.

A first oil recovery alkaline-surfactant solution was prepared by mixing sodium carbonate, a surfactant (PETROSTEP A-1), isobutyl alcohol, and deionized water. The solution contained 1.5 wt. % sodium carbonate, 0.75 wt. % of the surfactant, and 1 wt. % of isobutyl alcohol. 3 samples containing 10 ml of this solution were prepared in 20 ml test tubes. Sodium chloride was added to the samples so that one sample contained 0.3 wt. % NaCl, one sample contained 0.4 wt. % NaCl, and one sample contained 0.5 wt. % NaCl. 1000 ppm of calcium ion added as $CaCl_2$ was added to each of the samples.

A second oil recovery alkaline-surfactant solution was prepared by mixing ammonium hydroxide, a surfactant (PETROSTEP A-1), isobutyl alcohol, and deionized water. The solution contained 0.5 wt. % ammonium hydroxide, 0.75 wt. % of the surfactant, and 1 wt. % of isobutyl alcohol. 3 samples containing 10 ml of this solution were prepared in 20 ml test tubes. Sodium chloride was added to the samples so that one sample contained 1.7 wt. % NaCl, one sample contained 1.9 wt. % NaCl, and one sample contained 2.1 wt. % NaCl. 1000 ppm of calcium ion added as $CaCl_2$ was added to each of the samples.

A third oil recovery alkaline-surfactant solution was prepared by mixing ammonium hydroxide, sodium carbonate, a surfactant (PETROSTEP A-1), isobutyl alcohol, and deionized water. The solution contained 0.4 wt. % ammonium hydroxide (less than the second oil recovery alkaline-surfactant solution), 0.4 wt. % sodium carbonate (substantially less than the first oil recovery alkaline-surfactant solution), 0.75 wt. % of the surfactant, and 1 wt. % of isobutyl alcohol. 3 samples containing 10 ml of this solution were prepared in 20 ml test tubes. Sodium chloride was added to the samples so that one sample contained 1.3 wt. % NaCl, one sample contained 1.5 wt. % NaCl, and one sample contained 1.7 wt. % NaCl. 1000 ppm calcium ion added as $CaCl_2$ was added to each of the samples.

Figure 8:
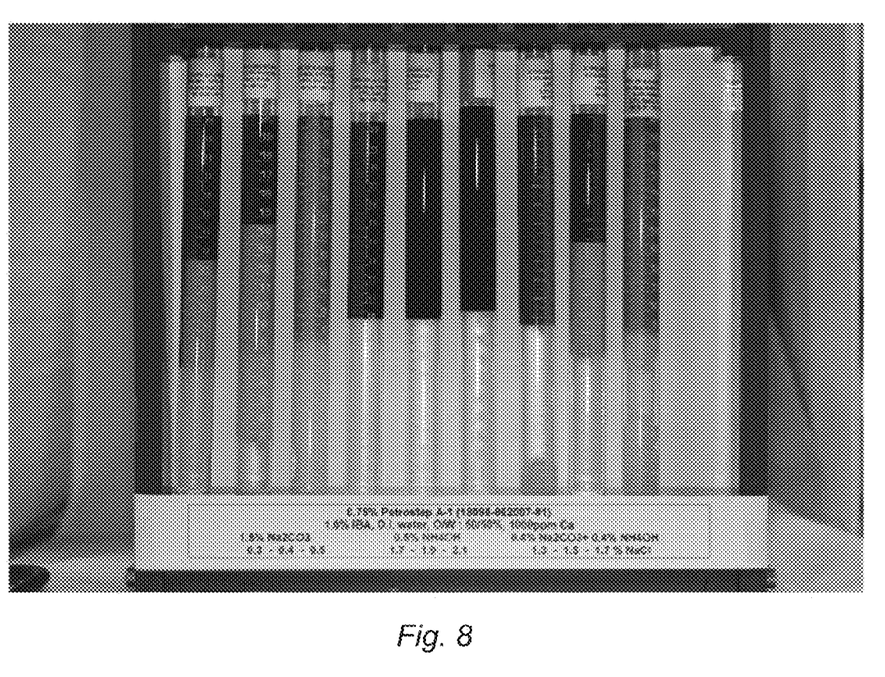
FIG. 8 is a photograph of equilibrated mixtures of an aqueous sodium carbonate/surfactant solution with oil, an aqueous ammonium hydroxide/surfactant solution with oil, and an aqueous ammonium hydroxide/sodium carbonate/surfactant solution with oil at different brine concentrations in the presence of $CaCl_2$.

10 ml of oil was added to each sample of the first, second, and third oil recovery alkaline-surfactant solutions after addition of the sodium chloride and calcium chloride thereto. The samples were then shaken and subsequently stored at 70° C. for 1 hour. The samples were then shaken again and then allowed to equilibrate. After equilibration, the samples were visually inspected to determine the phase behavior of the samples. A well-defined middle phase microemulsion was observed in the third oil recovery alkaline surfactant solution containing both ammonium hydroxide and sodium carbonate in the sample containing 1.5 wt. % NaCl despite the presence of $CaCl_2$ in the sample, indicating that the alkaline surfactant solution containing ammonium hydroxide and sodium carbonate significantly lowered the interfacial tension between the oil and water, and may be useful for mobilizing oil in a formation for production from the formation under optimized salinity conditions. A similar middle phase microemulsion was observed in the first oil recovery alkaline surfactant solution containing sodium carbonate without ammonium hydroxide in the sample containing 0.4 wt. % NaCl, and no middle phase microemulsion was observed in any of the samples of the second oil recovery alkaline surfactant solution containing ammonium hydroxide without sodium carbonate. FIG. 8 shows a photograph of the samples of each of the alkaline surfactant solutions after mixing with $CaCl_2$ and oil and subsequent equilibration.

This example demonstrated that a middle phase microemulsion can be formed with oil and water using an alkaline surfactant solution containing ammonium hydroxide and sodium carbonate as alkaline components.

The present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. While systems and methods are described in terms of "comprising," "containing," or "including" various components or steps, the compositions and methods can also "consist essentially of" or "consist of" the various components and steps. Whenever a numerical range with a lower limit and an upper limit is disclosed, any number and any included range falling within the range is specifically disclosed. In particular, every range of values (of the form, "from a to b," or, equivalently, "from a-b") disclosed herein is to be understood to set forth every number and range encompassed within the broader range of values. Whenever a numerical range having a specific lower limit only, a specific upper limit only, or a specific upper limit and a specific lower limit is disclosed, the range also includes any numerical value "about" the specified lower limit and/or the specified upper limit. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces.

What is claimed is:

1. A process for recovering oil from an oil-bearing formation, comprising:
    mixing a surfactant, water, a polymer, an alkali metal bicarbonate optionally combined with alkali metal carbonate and an ammonia liquid to form an oil recovery formulation;
    introducing the oil recovery formulation into the oil-bearing formation;
    contacting the oil recovery formulation with oil in the oil-bearing formation; and
    producing oil from the oil-bearing formation after introduction of the oil recovery formulation into the oil-bearing formation;
    calculating the minimum quantity of alkali metal bicarbonate optionally combined with alkali metal carbonate required to precipitate 100% of the estimated amount of calcium cations in the formation; and
    limiting the alkali metal bicarbonate optionally combined with alkali metal carbonate mixed with the surfactant, water, polymer, and ammonia liquid to at most 10 times the calculated minimum quantity of alkali metal bicarbonate optionally combined with alkali metal carbonate.

2. The process of claim 1 wherein the amount of ammonia liquid mixed with the surfactant, the polymer, the alkali metal bicarbonate optionally combined with alkali metal carbonate and the water is selected to comprise from 0.01 wt. % to 5 wt. % of the total weight of the oil recovery formulation and the amount of alkali metal bicarbonate mixed with the surfactant, water, the polymer, and the ammonia liquid is selected to comprise from 0.001 wt. % to 1 wt. % of the total weight of the oil recovery formulation.

3. The process of claim 1 wherein the ammonia liquid is anhydrous liquid ammonia.

4. The process of claim 1, wherein the surfactant is a blend of anionic surfactants selected from the group consisting of an alpha olefin sulfonate compound, an internal olefin sulfonate compound, a branched alkyl benzene sulfonate compound, a propylene oxide sulfate compound and an ethylene-propylene oxide sulfate compound.

5. The process of claim 1 wherein the polymer is partially hydrolyzed polyacrylamides.

6. The process of claim 1 wherein the oil recovery formulation comprises from 0.05 wt. % to 5 wt. % of the surfactant, from 200 ppm to 10000 ppm of the polymer, from 0.01 wt. % to 5 wt. % of the ammonia liquid, and from 0.001 wt. % to 1 wt % of the alkali metal bicarbonate optionally combined with alkali metal carbonate.

7. The process of claim 1 wherein the oil-bearing formation is a subterranean formation having a calcium ion exchange capacity of at least 0.25 meq/100 grams and a temperature of at least 60° C.

8. The process of claim 1 wherein the oil-bearing formation is a subsea formation.

9. The process of claim 1 wherein the oil recovery formulation has a dynamic viscosity within 50% of the dynamic viscosity of oil of the oil-bearing formation when measured isothermally at a formation temperature.

* * * * *